United States Patent
Guidotti et al.

(10) Patent No.: US 9,377,791 B2
(45) Date of Patent: Jun. 28, 2016

(54) MONITORING USER POSITION TO DETERMINE A TIME FOR PROVIDING A SPECIFIED STATE AT A USER PREMISES

(71) Applicant: International Business Machines Corporation, Armonk, NY (US)

(72) Inventors: Alice Guidotti, Rome (IT); Francesco Lecciso, Rome (IT); Leonardo Rosati, Rome (IT); Paolo Salerno, Monterotondo (IT)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 13/647,234

(22) Filed: Oct. 8, 2012

(65) Prior Publication Data

US 2014/0100699 A1    Apr. 10, 2014

(51) Int. Cl.
  *G05B 21/00* (2006.01)
  *G05D 23/19* (2006.01)
(52) U.S. Cl.
  CPC .................................. *G05D 23/1902* (2013.01)
(58) Field of Classification Search
  CPC ... G05D 23/19; G05D 23/00; G05D 23/1902; G05B 11/00
  USPC .......................................................... 700/276
  See application file for complete search history.

(56) References Cited

U.S. PATENT DOCUMENTS

| | | | |
|---|---|---|---|
| 5,579,221 A | 11/1996 | Mun | |
| 6,199,755 B1 | 3/2001 | Matsumoto et al. | |
| 7,809,786 B2 | 10/2010 | Yoon et al. | |
| 8,369,866 B2 * | 2/2013 | Ashley et al. | 455/456.1 |
| 2002/0147006 A1 * | 10/2002 | Coon et al. | 455/420 |
| 2005/0162273 A1 | 7/2005 | Yoon et al. | |
| 2010/0179708 A1 | 7/2010 | Watson et al. | |

(Continued)

FOREIGN PATENT DOCUMENTS

| | | | | |
|---|---|---|---|---|
| WO | 2009036764 A2 | | 3/2009 | |
| WO | WO 2009036764 A2 * | | 3/2009 | G05D 23/19 |
| WO | 2012024534 A2 | | 2/2012 | |

OTHER PUBLICATIONS

Jin, "A Smart Home Networking Simulation Model for Energy Saving," Masters Thesis, Carelton University, Jan. 2011, 192 pages.

(Continued)

*Primary Examiner* — Sean Shechtman
*Assistant Examiner* — Sivalingam Sivanesan
(74) *Attorney, Agent, or Firm* — Yee & Associates, P.C.; Richard A. Wilhelm

(57) ABSTRACT

An embodiment directed to a method for providing a specified state at a premises to which a user travels. Comprises determining a time of operation needed by a device located at the premises to provide the specified state, after device activation. One or more positions of the user are detected when the user is within a boundary, the boundary being determined in part by the time of operation. Detected user positions are used to determine a time of arrival of the user at the premises. A time to activate the device is computed from the arrival time and time of operation, collectively, wherein activating the device at the computed time causes the specified state to be provided at a time that coincides with arrival of the user at the premises.

20 Claims, 5 Drawing Sheets

(56) References Cited

U.S. PATENT DOCUMENTS

2011/0218650 A1* 9/2011 Crucs .......................... 700/13
2011/0224838 A1   9/2011 Imes et al.
2012/0053740 A1   3/2012 Venkatakrishnan et al.

OTHER PUBLICATIONS

"Smart Grid: Enabler of the New Energy Economy," Electronic Advisory Committee Report, Dec. 2008, 38 pages. Retrieved Mar. 14, 2012 from http://energy.gov/sites/prod/files/oeprod/DocumentsandMedia/final-smart-grid-report.pdf.

* cited by examiner

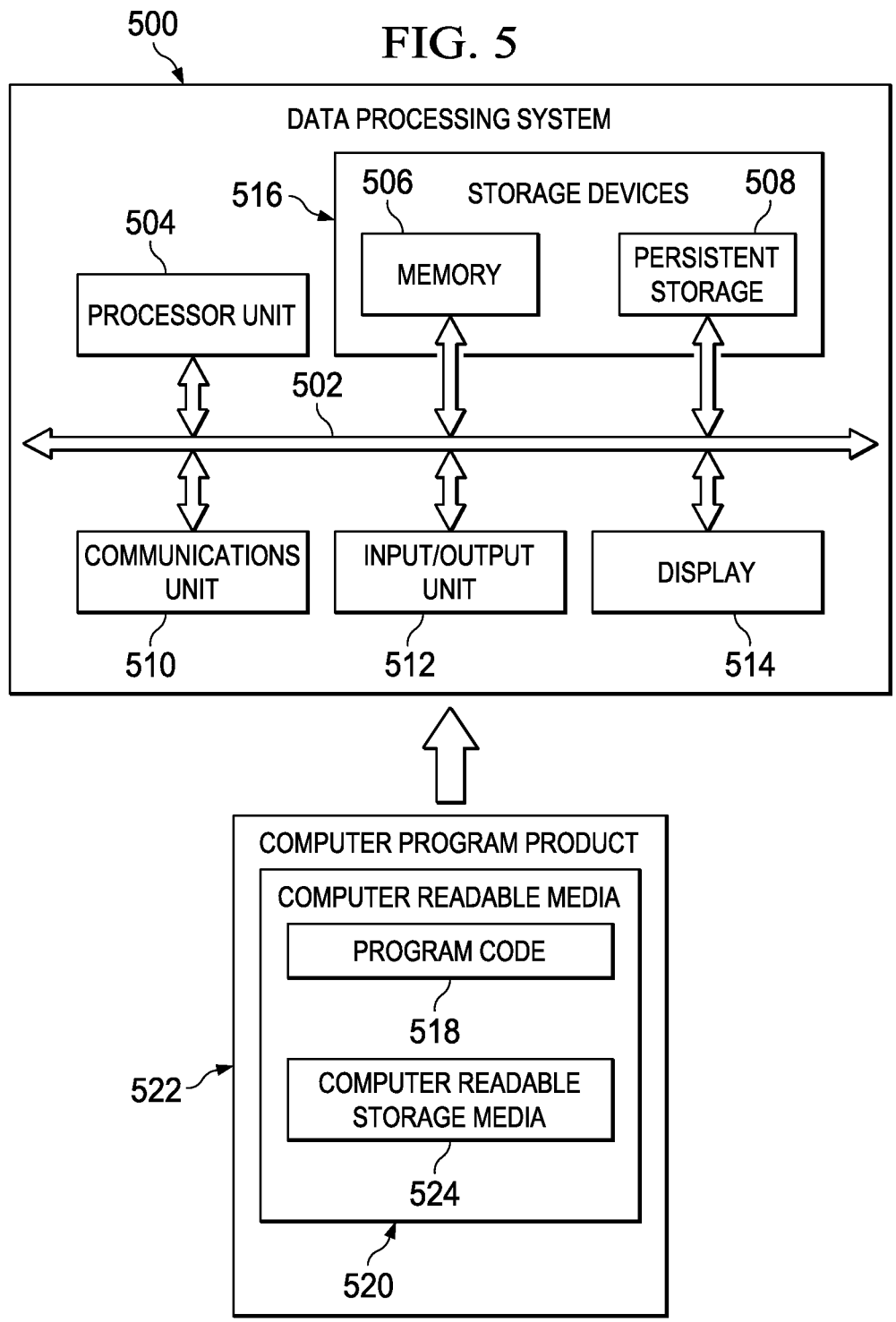

MONITORING USER POSITION TO DETERMINE A TIME FOR PROVIDING A SPECIFIED STATE AT A USER PREMISES

BACKGROUND

1. Field

The invention disclosed and claimed herein generally pertains to monitoring the position of a person traveling to a destination such as a house or apartment that is his or her home, and making use of the monitored information at the premises. More particularly, the information is used to determine the time at which a specified state, condition or event is caused to occur at the premises.

2. Description of the Related Art

Energy conservation is of increasing interest and concern. At present, energy savings in operations for heating and cooling homes and other buildings may be achieved by using certain sophisticated programmable thermostats. Typically, such devices are set to begin a heating or cooling task at a preselected time before a person anticipates arriving at home, after completing a day of work or other activity. The time is selected to provide sufficient time for the home to reach a temperature that will be comfortable, according to the person's tastes, at the time that he or she arrives home.

A common problem with arrangements of the above type is that they do not take into account any deviations in an initially planned or anticipated schedule. For instance, many different types of events could occur that would cause a person to arrive home much later than the time which was intended, when the person set his or her thermostat. Such events may include, by way of example, a traffic jam, an unexpected meeting, or a last-minute decision to spend the evening out somewhere. Clearly, energy will be used unnecessarily, during such additional time that the user is away from home. It would be very beneficial to eliminate, or to significantly reduce, this unnecessary use of energy.

SUMMARY

Embodiments of the invention are directed to acquiring information about a person's position, and also routes used and other information, when the person is traveling to his or her home from work or the like. The other information could include a person's relevant habits and prior travel history. The acquired information is used to determine the time for causing a state, condition, or event to occur, to within a fairly precise limit or degree. One useful state would be to have the person's home reach a pre-specified temperature, by heating or cooling as needed, at or near the time that the person arrives home. However, the invention is not limited thereto. The state, condition or event alternatively could be, by way of example, switching on outdoor lighting at the person's home, or switching on indoor music, just when the person arrives at home. In yet other embodiments of the invention, multiple states or events, including those described above and others, could all occur at a specified time, such as when the person arrives home.

One embodiment of the invention is directed to a method for providing a specified state or condition at a premises to which a user is disposed to travel, wherein the premises comprises a specified building or building portion, selectively. The method comprises the step of determining a time of operation needed by a device located at the premises to provide the specified state, after the device has been activated. The method further comprises detecting one or more positions of the user when the user is within a boundary, wherein the boundary is determined at least in part by the time of operation. One or more detected user positions are used to determine a time of arrival of the user at the premises. A time to activate the device is computed from the determined arrival time and time of operation, collectively, wherein activating the device at the computed time causes the specified state to be provided at a specified time. The specified time usefully is a time that coincides with arrival of the user at the premises, to within a prespecified limit.

BRIEF DESCRIPTION OF THE SEVERAL VIEWS OF THE DRAWINGS

FIG. 5 is a block diagram showing a computer or data processing system that may be used in implementing embodiments of the invention.

DETAILED DESCRIPTION

Figure 1:
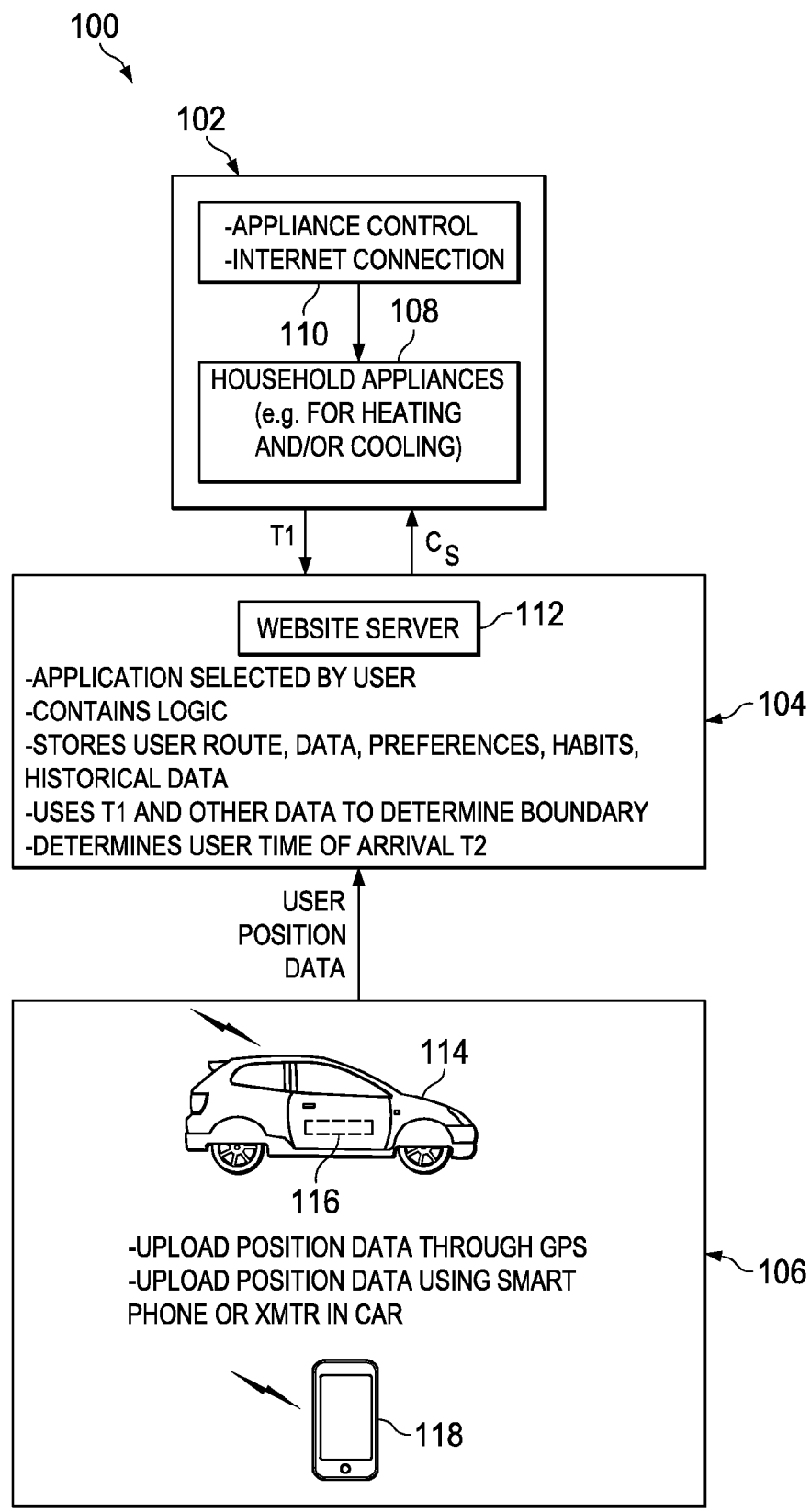
FIG. 1 is a schematic diagram showing components for implementing an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown an embodiment of the invention comprising a system 100 that generally includes components 102-106. By way of example and not limitation, a user of system 100 has a home or domicile that comprises a building, such as a house, or a portion of a building such as an apartment. The user desires to maintain a specified temperature in the interior space of the home, e.g. 72° Fahrenheit, whenever he or she is there. However, the user also would like to reduce energy use when he or she is away from the home, by not making any effort to maintain the specified temperature. Respective system components 102-106 of system 100 are configured to interact, as described hereinafter in further detail, to achieve these objectives for a user.

It is to be emphasized that embodiments of the invention can pertain to buildings and portions of buildings that are used for purposes other than homes or domiciles. For example, embodiments can pertain to buildings and portions of buildings that are used only for commercial or recreational purposes. Each building and portion of building to which embodiments of the invention pertain is referred to herein as "a premises".

Component 102 includes one or more devices 108. For the embodiment of FIG. 1, a device 108 can comprise a furnace or other appliance for home heating, an appliance for home cooling, or a set of appliances 108, one for heating and one for cooling. Such set of appliances 108 may be used to provide the specified temperature for varying seasons of the year, and for varying weather conditions. Also, each appliance 108 is usefully an electrical device. Each appliance or device can then be readily switched on to perform a particular household task or to provide a particular state or condition at the user's premises. These appliances and devices can also be readily switched off, to reduce energy usage.

For other embodiments of the invention, devices 108 of component 102 can be selected from a number of different types of household appliances or devices, which respectively are able to provide a state, or to cause an event at a person's home or other premises. These types of devices are exemplified, without limitation, by an outdoor lighting display, and an indoor music system, which can each be switched on at a given time.

Moreover, it is to be emphasized that in some embodiments of the invention, two or more different devices 108 can all be operated simultaneously by system 100. Such operation could be used to cause each of the devices to produce their respective states and events at the same specified time, such as at the time the user arrives home.

FIG. 1 shows that component 102 further comprises a subcomponent 110, which includes a control for appliances 108, and also includes means for connecting the appliance control to a network such as the Internet. Thus, signals $C_S$ can be sent over the network to operate the appliance control, in order to turn respective appliances 108 on and off, at times determined by the signals. Moreover, appliances or devices 108 do not need to have any special features, other than to have an interface for operation by the appliance control.

Component 102 further includes a thermometer device or the like (not shown) for monitoring the ambient temperature in a home or other premises where appliances 108 are located. The ambient temperature at a given time is used to determine a time T1, the time required to reach a specified temperature state within the home, if the appropriate appliance 108 is switched on at the given time. Thus, the heating, or cooling, appliance would be switched on, if the initial monitored temperature was lower, or higher, respectively, than the desired specified temperature.

Referring further to FIG. 1, there is shown component 104 provided with a website server 112, wherein an application is loaded onto the website to manage operations and computations of system 100. The application is usefully selected by the user of system 100, such as from a cloud computing service or from Google. Server 112 receives the T1 time values from component 102, and also receives position data pertaining to the user, with respect to his home or premises, from component 106.

Server 112 also has the capability to simultaneously manage multiple different devices 108, in the event this is desired.

Thus, if multiple devices are each required to produce their respective states and events at the same specified time, as described above, server 112 would determine the particular time at which an operating signal $C_s$ is needed to be sent to each different device. Server 112 would then send a signal $C_s$ to each one of the multiple devices, wherein a given device would receive a signal $C_s$ at a time that would operate the given device to produce its state or event at the specified time.

Server 112 contains logic for using the user position data to determine preferred routes that the user takes to reach home, and to also determine the time it will take him to arrive home when using the different routes. From this information, server logic computes a value T2, which is the time when the user will arrive home, following the computation or other event.

By storing received user position data at component 104 over a period of time, a travel history of the user is compiled. From this information, the server 112 can learn preferred routes and habits of the user. The user may also furnish certain information directly to the server 112, such as the identities of multiple users of the same home or premises. It is anticipated that as this information is used, computations of arrival time T2 will become increasingly accurate. Moreover, it is to be emphasized that server 112 can perform all of its functions described herein for multiple users. This includes multiple users who share the same premises, and also includes multiple users who all have different premises from one another.

In determining values of T2, embodiments of the invention may use one of two approaches, as described hereinafter in further detail in connection with FIG. 3. In one approach, T2 is computed based on the user traveling a route or path which is well known to the server 112, based on previously acquired travel data. The other approach is used when travel data that has just been acquired does not match a pattern known by the server 112. For this situation, T2 is computed using a standard algorithm based on speed, route and position of the user, as indicated by the most recently acquired user position data.

A further task carried out by website server 112 is to determine a boundary around the user's home or premises, which is a function of T1 received from component 102. This is described hereinafter in further detail, in connection with FIG. 2.

Component 106 of FIG. 1 illustrates two modes for supplying user position data to component 104 and server 112, as the user is traveling. In a first mode, the user's car 114 is provided with a Global Positioning System (GPS) device 116. This device has a GPS receiver, which provides the GPS position of car 114 any time. The device 116 is further provided with a transmitter, which is capable of sending GPS positions over a wireless Internet link or the like, at prespecified intervals, to the component 104.

As a second mode for uploading user position information, the user may carry a mobile phone 118, such as a smart phone which has GPS capability. GPS positioning information received at the phone would thus represent the user's position at a given time. The phone could also be used to transmit or upload the GPS information to component 104 and server 112.

Figure 2:
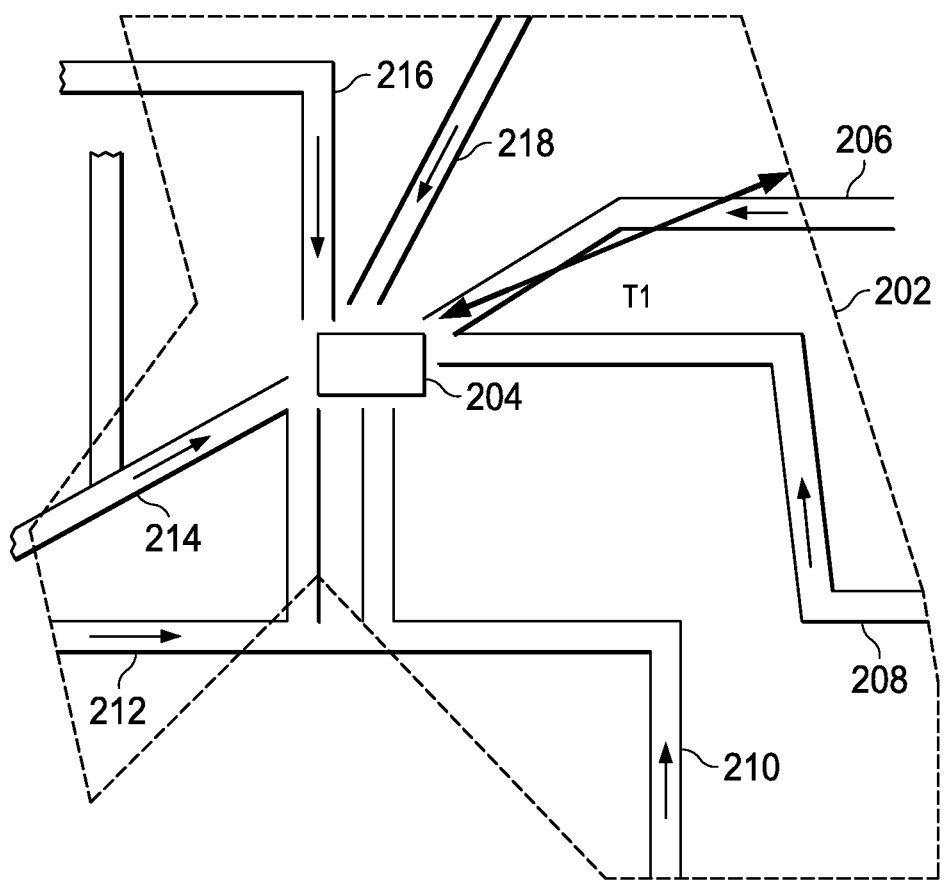
FIG. 2 is a schematic diagram further illustrating important concepts of an embodiment of the invention.

Referring to FIG. 2, there is shown a boundary 202 that encloses a geographic region which includes the home 204 or other premises of a system 100 user, wherein the boundary 202 is determined by server 112. More particularly, boundary 202 is determined as a function of T1, the time required to heat or cool home 204 to a specified temperature, as described above. In accordance with operation of system 100, a GPS device such as 116 or 118 continually emits user position signals, at intervals such as 1 minute. Periodically, system 100 polls the website of server 112, to assess these user position signals. If the user position is found to not be within boundary 202, the periodic checks or assessments continue. However, if the user's position is within the boundary, system 100 checks to determine whether the user is traveling along a route or path that is currently known by server 112, such as from the stored historical data.

In one embodiment, the boundary 202 is determined by first recognizing that by monitoring user positions over time, the server 112 has learned that routes 206-218 are alternative paths the user may take, when traveling to his home 204. The server 112 has also learned the highest speed that the user will travel at on each route. Accordingly, to establish the boundary for a given route, the server computes a given location for that route. The given location is selected so that if the user travels along the given route from the given location to his home, and travels at his highest speed for the given route, his time T2 for arriving at home would be equal to the time T1. The boundary 202 is then selected to pass through each computed given location for the routes 206-218.

By computing boundary 202 as described above, the user will always require a time to reach home that is not less than T1. Thus, there will be sufficient time to warm or cool the home, before the user arrives.

As an example of the operation of system 100, the user crosses the boundary 202 on the route 208, directed toward home 204, at five o'clock in the afternoon. Server 112 has previously learned that traveling this route at this time is a normal routine for the user, in returning home from work. The server also receives a signal T1 at this time, indicating that a time of 20 minutes is then required to heat home 204 to the specified temperature. From the user's travel history, it is estimated that the user will arrive home 30 minutes after crossing the boundary, when traveling on route 208. Accordingly, system 100 sends a signal to turn on the heating device in home 204 at a time that is 10 minutes after the user crossed boundary 202.

In the above example, previously learned habits of a user can also be important. For example, system 100 could have learned that on Thursdays, the user always stops for 20 minutes at some location after crossing boundary 202 on route 208 (e.g., the post office or a laundry). This time would have to be included in determining the user's expected arrival time T2. In addition, there could be multiple users, such as a husband and wife, who each were monitored for travel to home 204, and who each had his or her own schedules and routines.

Figure 3:
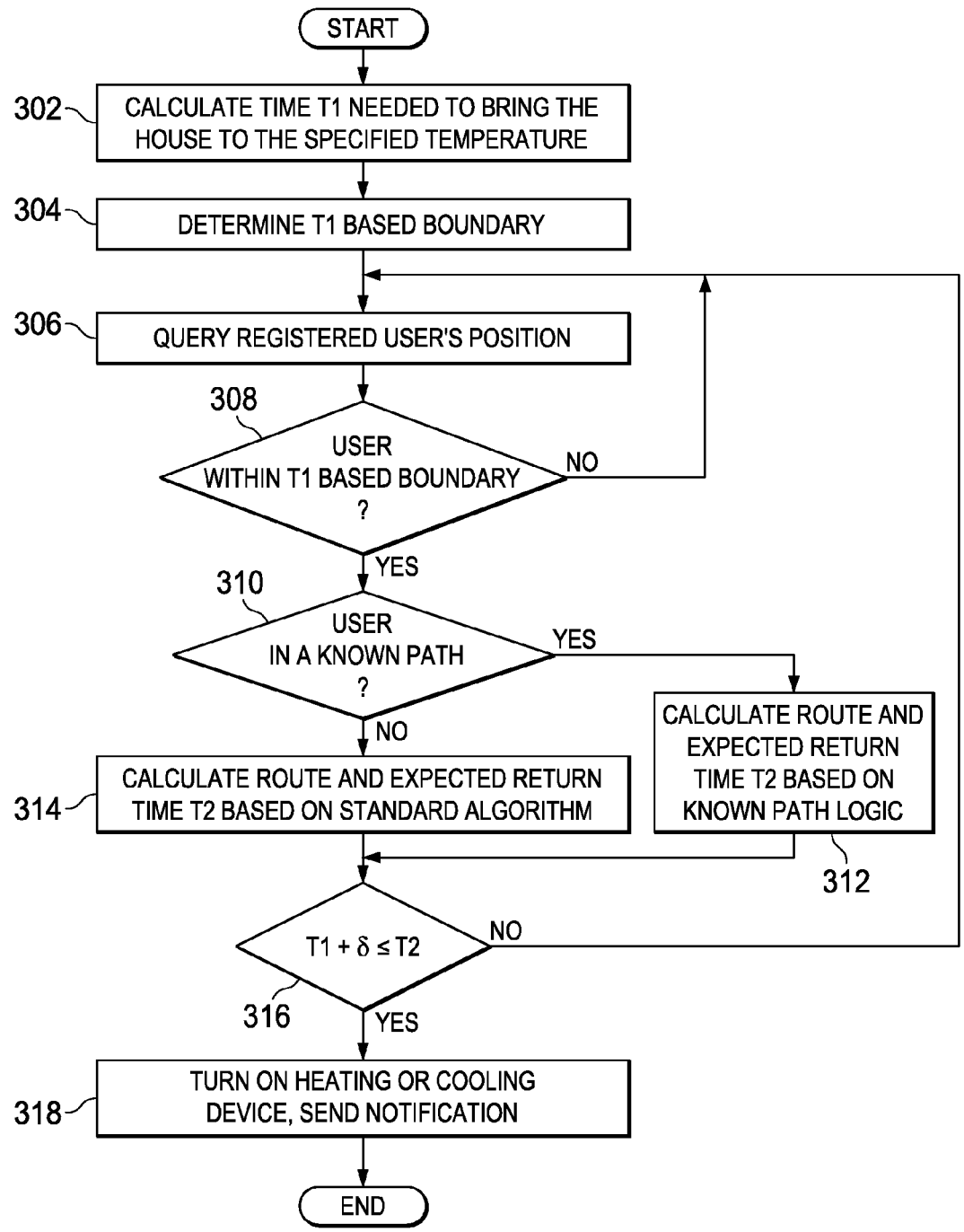
FIG. 3 is a flowchart showing steps of a method comprising an embodiment of the invention.

Referring to FIG. 3, there are shown steps of a method comprising an embodiment of the invention. At step 302, the time T1 is calculated, which is the time required to either heat or cool the home of a user to a specified temperature, wherein the user is registered with a system such as system 100. As described above, this can be carried out by component 102 of system 100. At step 304, a T1 based boundary is determined, as described above in connection with FIG. 2.

Step 306 uses position data, uploaded from a registered user's GPS or the like, to query the position of the user. Decision step 308 determines whether the user is positioned within the T1 based boundary. If this determination is negative, the method is routed back to step 306. Otherwise, if the user is found to be within the T1 boundary, the method proceeds to decision step 310.

At step 310, it is necessary to determine whether or not the user is in a known path. To do this, system 100 considers position, speed and route of user, to determine whether these metrics correspond to a path or route the user has used before, as indicated by the stored historical data of the user. If the decision at step 310 is affirmative, the method proceeds to step 312. The method proceeds to step 314, if the decision is negative.

At step 312, the route and expected arrival time T2 are calculated, such as by website server 112. It is important to consider habits of a registered user which the server has learned, as well as route and speed information. For example, certain travel patterns within the boundary may indicate that the user will stop at a school for a period of 20 minutes, and then proceed along a known route to his or her home. Also, if there are multiple registered users at a particular home, each of them must be uniquely identified, and each of their respective individual habits must be learned and responded to.

Referring further to FIG. 3, step 314 is directed to calculating the route and expected arrival time, if the user is found to be proceeding in a pattern that is not known to the server. To carry out this step, current user position data is used to determine the user speed, data and position. A standard or conventional algorithm is then used to calculate the expected arrival time T2.

Following calculation of T2 at either step 312 or 314, the method of FIG. 3 proceeds to decision step 316. This step determines whether or not T2 is equal to or greater than T1 plus a tuning factor δ. If the determination is negative, the method returns to step 306, and if the determination is positive, the method proceeds to step 318. Thus, the heating or cooling device can be turned on by computing or determining a time when T1 plus δ is no greater than T2. In a useful embodiment, for a negligible or zero tuning factor, the time at which the heating or cooling device is turned on, is computed to be a time at which T1 and T2 are equal. This would result in the specified temperature being realized, coincident with arrival of the user at his home. In other embodiments, T1 and T2 values may be used to compute other times for activating the heating or cooling devices, or other devices 108.

In at least some embodiments of the invention, it is anticipated that a computed value T1, the time required to heat or cool an interior air space as shown by a thermometer somewhere in the air space, will only be accurate to a limit on the order of minutes, such as five minutes. Accordingly, for nominally equal values of T1 and T2, a user could arrive home and find the desired temperature had not yet been reached. On the other hand, the desired temperature could have been reached some time prior to the user's arrival, thus using energy unnecessarily. The tuning factor δ enables a user to choose which of these events he would prefer to have happen.

At step 318, the heating device or cooling device, as appropriate, is turned on. The method then ends. A notification of this action may be sent to the user.

Figure 4:
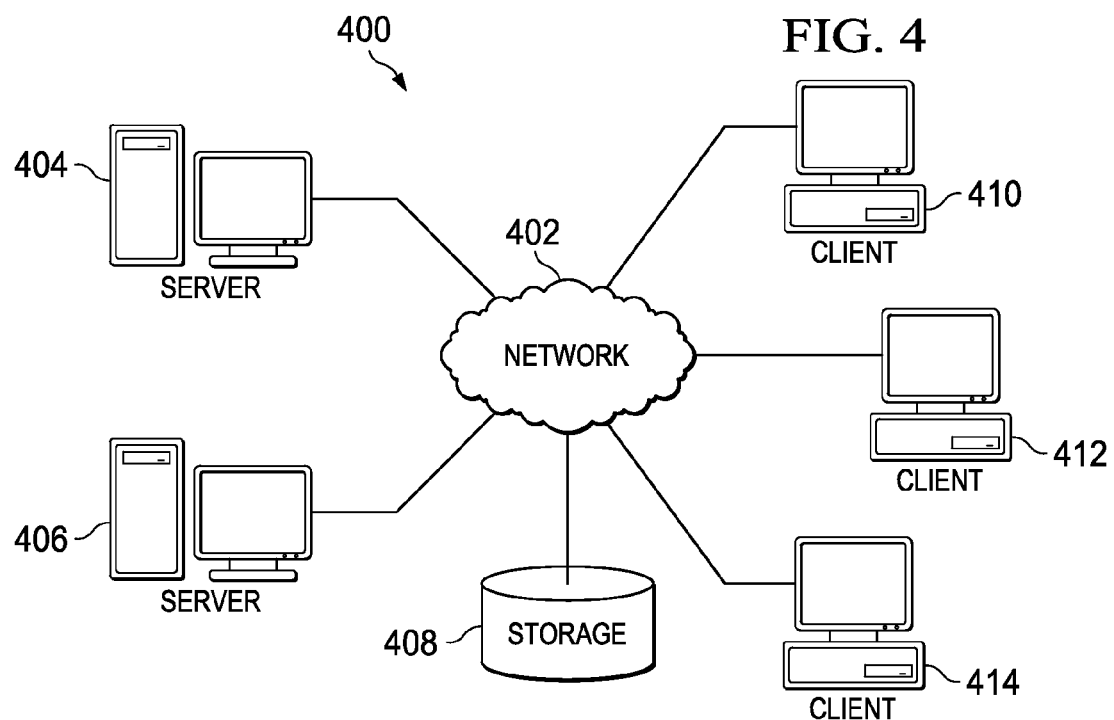
FIG. 4 is a block diagram showing a network of data processing systems in which an embodiment of the invention may be implemented.

FIG. 4 is a pictorial representation of a network of data processing systems in which illustrative embodiments of the invention may be implemented. Network data processing system 400 is a network of computers in which the illustrative embodiments may be implemented. Network data processing system 400 contains network 402, which is the medium used to provide communications links between various devices and computers connected together within network data processing system 400. Network 402 may include connections, such as wire, wireless communication links, or fiber optic cables.

In the depicted example, server computer 404 and server computer 406 connect to network 402 along with storage unit 408. In addition, client computers 410, 412, and 414 connect to network 402. Client computers 410, 412, and 414 may be, for example, personal computers or network computers. In the depicted example, server computer 404 provides information, such as boot files, operating system images, and applications to client computers 410, 412, and 414. Client computers 410, 412, and 414 are clients to server computer 404 in this example. Network data processing system 400 may include additional server computers, client computers, and other devices not shown.

Program code located in network data processing system 400 may be stored on a computer-recordable storage medium and downloaded to a data processing system or other device for use. For example, program code may be stored on a computer-recordable storage medium on server computer 404 and downloaded to client computer 410 over network 402 for use on client computer 410.

In the depicted example, network data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 400 also may be implemented as a number of different types of networks, such as, for example, an intranet, a local area network (LAN), or a wide area network (WAN). FIG. 4 is intended as an example, and not as an architectural limitation for the different illustrative embodiments.

Turning now to FIG. 5, an illustration of a data processing system is depicted in accordance with an illustrative embodiment. The data processing system may be used as one or more of the components for network system 500. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer-readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer-usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these examples. In one example, computer-readable media 520 may be computer-readable storage media 524. Computer-readable storage media 524 may include, for example, an optical or magnetic disk that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive, or a flash memory, that is connected to data processing system 500. In some instances, computer-readable storage media 524 may not be removable from data processing system 500.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

As another example, a storage device in data processing system 500 is any hardware apparatus that may store data. Memory 506, persistent storage 508, and computer-readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In association with a premises, comprising a specified building or building portion, selectively, to which a user is disposed to travel, a computer implemented method for providing a specified state at the premises comprising the steps of:
   determining a time of operation needed by a device located at the premises to provide the specified state, after the device has been activated;
   the computer detecting one or more positions of the user when the user is within a boundary, wherein the boundary is determined at least in part by the time of operation needed by the device located at the premises to provide the specified state after the device has been activated;
   the computer using one or more detected positions of the user to determine a time of arrival of the user at the premises;
   the computer computing a time to activate the device from the determined time of arrival and time of operation, collectively; and
   activating the device at the computed time to provide the specified state at a specified time.

2. The method of claim 1, wherein:
   the specified time coincides with arrival of the user at the premises, to within a prespecified limit.

3. The method of claim 1, wherein:
   multiple different devices are located at the premises, wherein each device provides its corresponding state after being activated, and a single server is operated to activate each of said multiple devices, to cause each of said devices to provide its corresponding state at said specified time.

4. The method of claim 1, wherein:
   a single server is operated to carry out said determining, detecting, using and computing steps for each one of multiple users, wherein two or more of said users share the same premises, or each user has a different premise, selectively.

5. The method of claim 1, wherein:
   user related data collected over time, including user position data within the boundary, is stored for use to learn routes traveled by the user to the premises, and to learn travel times associated with said routes.

6. The method of claim 5, wherein:
   the stored user related data is used to determine whether a route currently being traveled by the user corresponds to one of said learned routes.

7. The method of claim 6, wherein:
   responsive to determining that the currently traveled route corresponds to a given one of said learned routes, information pertaining to the given learned route is used to determine the time of the arrival of the user at the premises, for the currently traveled route.

8. The method of claim 7, wherein:
   responsive to determining that the route currently being traveled does not correspond to any of said learned routes, one or more positions of the user detected during the currently traveled route are used to determine the time of arrival of the user at the premises, for the currently traveled route.

9. The method of claim 5, wherein:
   the stored user related data is used to identify a particular user of multiple users, which are each disposed to travel to the premises.

10. The method of claim 1, wherein:
    the time of operation is determined at the premises.

11. The method of claim 1, wherein:
    the time to activate the device is computed by a server that is located remotely from the premises.

12. The method of claim 11, wherein:
    the device is activated to provide the specified state by a signal sent over a specified network connection, from the server that is located remotely from the premises.

13. The method of claim 11, wherein:
    user related data collected over time, including user position data within the boundary, is stored for use by the remotely located server.

14. The method of claim 1, wherein:
    the specified state comprises a specified ambient temperature of an enclosed air space within the premises, and the device comprises a heating appliance or cooling appliance, selectively, which is activated to establish the specified ambient temperature.

15. The method of claim 1, wherein:
    positions of the user are detected using a specified Global Positioning System (GPS) device.

16. In association with a premises, comprising a specified building or building portion, selectively, to which a user is disposed to travel, a computer program product comprising a non-transitory recordable storage medium encoded with program instructions configured for providing a specified state at the premises, said program instructions comprising:
    instructions for determining a time of operation needed by a device located at the premises to provide the specified state, after the device has been activated;
    instructions for detecting one or more positions of the user when the user is within a boundary, wherein the boundary is determined at least in part by the time of operation needed by the device located at the premises to provide the specified state after the device has been activated;
    instructions for using one or more detected positions of the user to determine a time of arrival of the user at the premises;
    instructions for computing a time to activate the device from the determined time of arrival and time of operation, collectively; and
    instructions for activating the device at the computed time to provide the specified state at a specified time.

17. The computer program product of claim 16, wherein:
    user related data collected over time, including user position data within the boundary, is stored for use to learn routes traveled by the user to the premises, and to learn travel times associated with said routes.

18. The computer program product of claim 17, wherein:
    responsive to determining that the currently traveled route corresponds to a given one of said learned routes, information pertaining to the given learned route is used to determine the time of the arrival of the user at the premises, for the currently traveled route.

19. In association with a premises, comprising a specified building or building portion, selectively, to which a user is disposed to travel, a computer system for providing a specified state at the premises comprising:
    a bus;
    a memory connected to the bus, wherein program code is stored on the memory; and
    a processor connected to the bus, wherein the processor unit executes the program code to determine a time of operation needed by a device located at the premises to provide the specified state, after the device has been activated; detect one or more positions of the user when the user is within a boundary, wherein the boundary is determined at least in part by the time of operation needed by the device located at the premises to provide the specified state after the device has been activated; use one or more detected positions of the user to determine a time of arrival of the user at the premises; and compute a time to activate the device from the determined time of arrival and time of operation, collectively, wherein activating the device at the computed time causes the specified state to be provided at a time that coincides with arrival of the user at the premises, to within a prespecified limit.

20. The system of claim 19, wherein:
user related data collected over time, including user position data within the boundary, is stored for use to learn routes traveled by the user to the premises, and to learn travel times associated with said routes.

\* \* \* \* \*